United States Patent
Carpenter, Jr. et al.

(10) Patent No.: US 7,078,621 B1
(45) Date of Patent: Jul. 18, 2006

(54) GROUNDING SYSTEM FOR FLOATING ROOFS IN FLAMMABLE STORAGE TANKS

(75) Inventors: Roy B. Carpenter, Jr., Boulder, CO (US); Darwin N. Sletten, Westminster, CO (US)

(73) Assignee: Lightning Eliminators & Consultants, Inc., Boulder, CO (US)

( * ) Notice: Subject to any disclaimer, the term of this patent is extended or adjusted under 35 U.S.C. 154(b) by 443 days.

(21) Appl. No.: 09/769,670

(22) Filed: Jan. 25, 2001

(51) Int. Cl.
*H05K 5/02* (2006.01)

(52) U.S. Cl. .............................. 174/51; 174/59; 174/60; 174/40 CC; 439/98

(58) Field of Classification Search ................ 174/51, 174/59, 60, 6, 35 C, 40 CC, 69, 100; 439/98, 439/100, 92; 242/371, 379; 220/222
See application file for complete search history.

(56) References Cited

U.S. PATENT DOCUMENTS

| | | | | |
|---|---|---|---|---|
| 3,453,493 A | * | 7/1969 | Godwin, Jr. ................ | 361/215 |
| 3,887,254 A | * | 6/1975 | Landis et al. ................ | 439/4 |
| 3,942,674 A | * | 3/1976 | Nelson ........................ | 220/221 |
| 4,806,937 A | * | 2/1989 | Peil ............................ | 342/175 |
| 4,940,859 A | * | 7/1990 | Peterson .................... | 191/12.4 |
| 5,159,523 A | * | 10/1992 | Claassen et al. ............. | 361/215 |
| 6,127,934 A | * | 10/2000 | Powell et al. ............... | 340/649 |

OTHER PUBLICATIONS

Prior sale of earlier and diffrernet test model in Israel on or about Jul. 28, 1999. (Not prior art act under 102).

* cited by examiner

*Primary Examiner*—Dhiru R. Patel
(74) *Attorney, Agent, or Firm*—Patent Law Offices of Rick Martin, P.C.

(57) ABSTRACT

Lightning at or near the site of an oil storage tank can cause a charge build up in the tank. This charge must be discharged to ground at rapid speeds to prevent arcing, sparks and fire. The tank has a metal floating roof which can be used to discharge the charge to ground by connecting a low impedance braided wire to the floating roof, and then connecting the wire to a take up reel at the top rim of the tank. The take up reel keeps any slack out of the wire. The path to ground is liquid to floating roof, to braided wire, to take up reel, to wall of tank, to earth ground.

16 Claims, 4 Drawing Sheets

GROUNDING SYSTEM FOR FLOATING ROOFS IN FLAMMABLE STORAGE TANKS

FIELD OF THE INVENTION

The present invention relates to a low impedance grounding system for grounding tank roofs and reducing the bound charge in floating roof tanks.

BACKGROUND OF THE INVENTION

The roof of many large crude storage tanks is open in the sense that there in no permanently attached roof. The roof floats on top of the product. To prevent vapors from escaping from around the edge of the roof, it is common to provide some sort of seal. These seals are made of a non-conductive material, usually neoprene. This material isolates the roof from the tank wall electrically and from any connection to earth. To overcome this problem, the industry has installed a device called a "shunt." These shunts are attached to the roof in such a manner that they are to be in constant contact with the tank regardless of the position of the floating roof. To make contact, these shunts are made with metal fingers which are spring-loaded and are made springy by the material used. These shunts require constant maintenance for several reasons:

1. Since the roof floats, it can easily drift slightly off-center and disconnect from the shunt on the opposite side.

2. Wax and other heavy crude elements tend to deposit between the tank wall and the shunt fingers, leaving a small gap which can cause arcing and fire.

Such a fire is called a "rim fire". In this case, the arc ignites the gasses always prevalent around the rim just above the seal.

During an electrical storm, the electrostatic field will induce a charge on both the tank and the contained product. Lightning dissipaters will discharge both the tank and the product for most situations. However, if the tank has a large diameter, the storm cell contains an unusually large charge, the product near the center will not be completely discharged. If the shunts are not in perfect contact with the tank wall, the "bound charge" will create an arc when that storm cell is discharged by a nearby strike. Refer to the American Petroleum Institute (API) Recommended Practices RP2003 for details on the Bound Charge/Secondary Arc. Some companies have tried to use long wires that extend from the top of the tank down to the center of the floating roof. The problem with this technique is that the impedance of the wire is far too high to react within the time available to discharge a bound charge (about one microsecond. The average impedance of these connections is between 150 and 250 Ohms at lightning frequencies.

Eliminating the risk of a bound charge arcing requires making a full-time positive connection between the tank wall and roof of the tank, as well as having a low impedance path of about one Ohm or less. Making a positive connection will eliminate this risk and any other phenomena that can create a body of bound charge. The present invention discloses a grounding system that will satisfy the above requirements in one complete assembly. The copper braid has an impedance of about one Ohm.

SUMMARY OF THE INVENTION

The main aspect of the present invention is to provide a cable having low impedance, the cable being electrically connected to a floating roof and the wall of the tank that the floating roof floats in.

Another aspect of the present invention is to provide a take up reel to keep the slack out of the cable, and minimize the impedance.

Other aspects of this invention will appear from the following description and appended claims, reference being made to the accompanying drawings forming a part of this specification wherein like reference characters designate corresponding parts in the several views.

A reel is mounted at the top of the inside of a fluid/liquid storage tank. The grounding cable unreels from the reel as the floating roof is lowered down into the tank as the stored fluid/liquid level lowers. As the floating roof rises a take up assembly in the reel takes up the slack, preferably by maintaining a constant pressure on the grounding cable. Electric charge in the stored fluid/liquid is collected through the floating roof, conducted through the grounding cable, and the reel, to the tank wall and thence to the earth ground.

The reel assembly guide is constructed from 316 stainless steel, with provisions for mounting on the top edge of the tank: one model for edge mounting, and the other for mounting on the top angle. The flat copper conductor end is attached to a roof structure, using several possible options. Since floating roof tanks tend to have large diameters, they can accumulate a very large body of charge in the center of the tank. That charge must be carried to the closest location of the tank wall. To assure that path is not too long, more than one grounding system may be required. To provide an estimate of the number of these grounding systems, the following criteria is suggested:

Tank Diameter (Meters) versus # of Grounding Systems Recommended

| | |
|---|---|
| Up to 30 | 1 |
| Up to 50 | 2 |
| Up to 60 | 3 |
| Up to 70 | 4 |
| Up to 80 | 5 |
| Up to 90 | 6 |
| Up to 100 | 8 |

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF DRAWINGS

Figure 1:
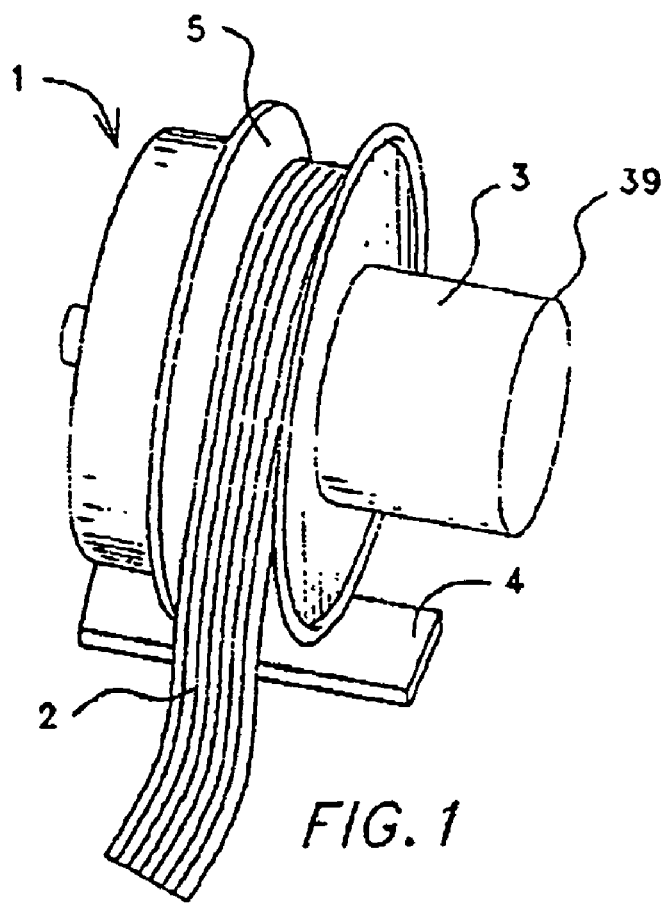
FIG. 1 is a perspective view of a reel.
Figure 3:
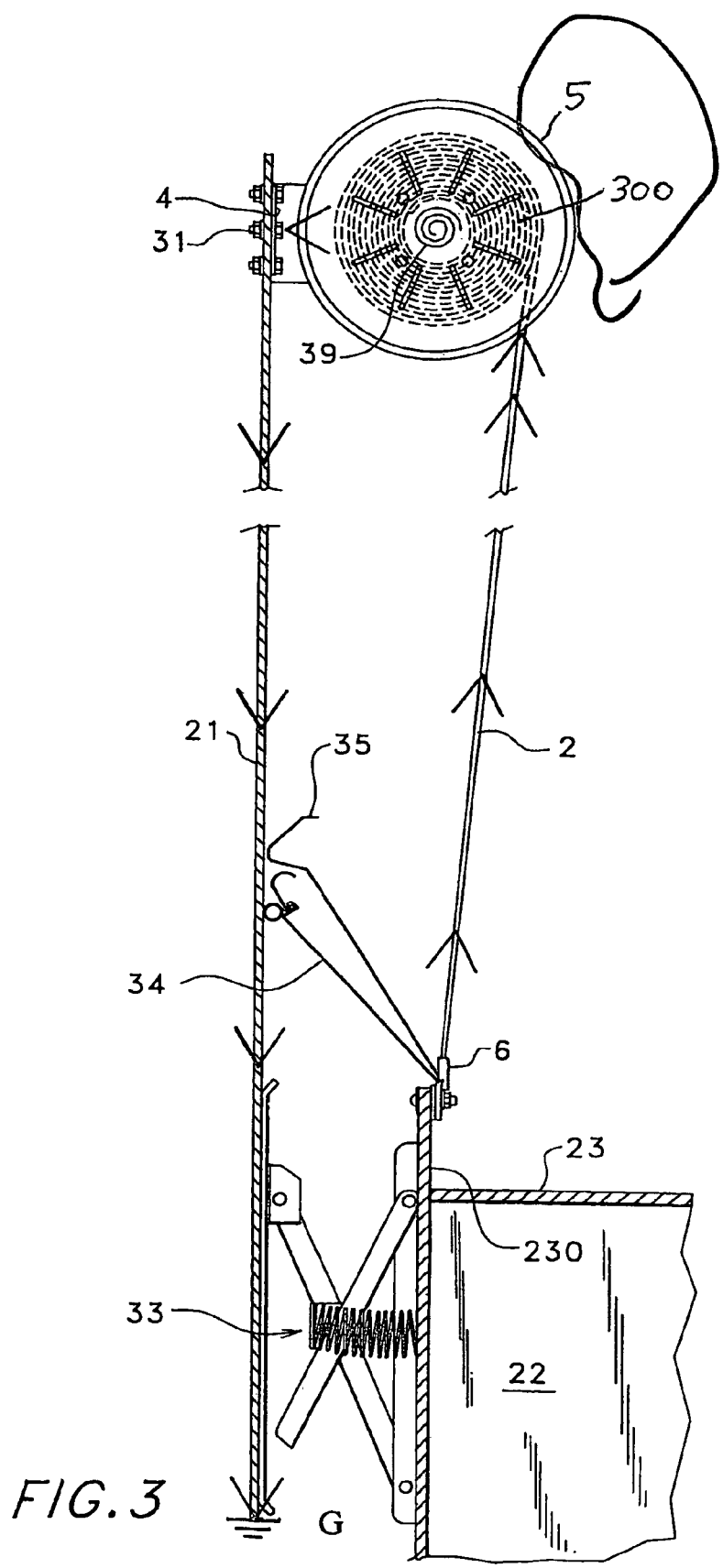
FIG. 3 is a vertical sectional view of the tank shown in FIG. 2.

Referring first to FIG. 1 a reel 1 has a base 4 which is preferably bolted onto the top of the tank as seen in FIG. 3. The spool 5 of the reel 1 receives a 480/30 flat braided copper wire 2 or any wire which offers a very low impedance to a lightning strike. Wire 2 may be un-insulated. A housing 3 covers a coil spring 39 which constantly pulls on the wire 2 to keep out the slack.

Figure 2:
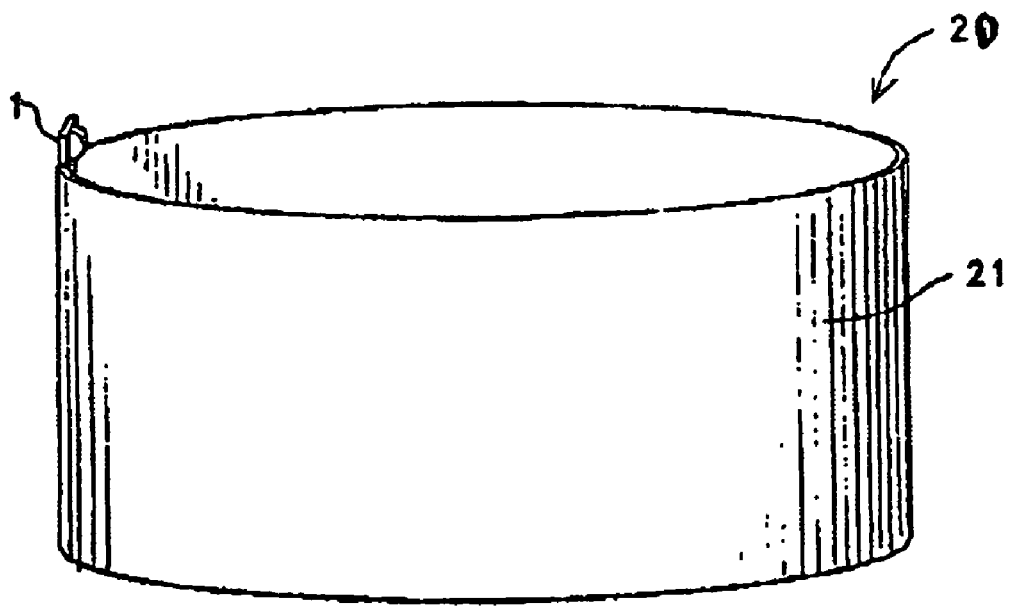
FIG. 2 is a top perspective view of a fluid/liquid storage tank.
Figure 2A:
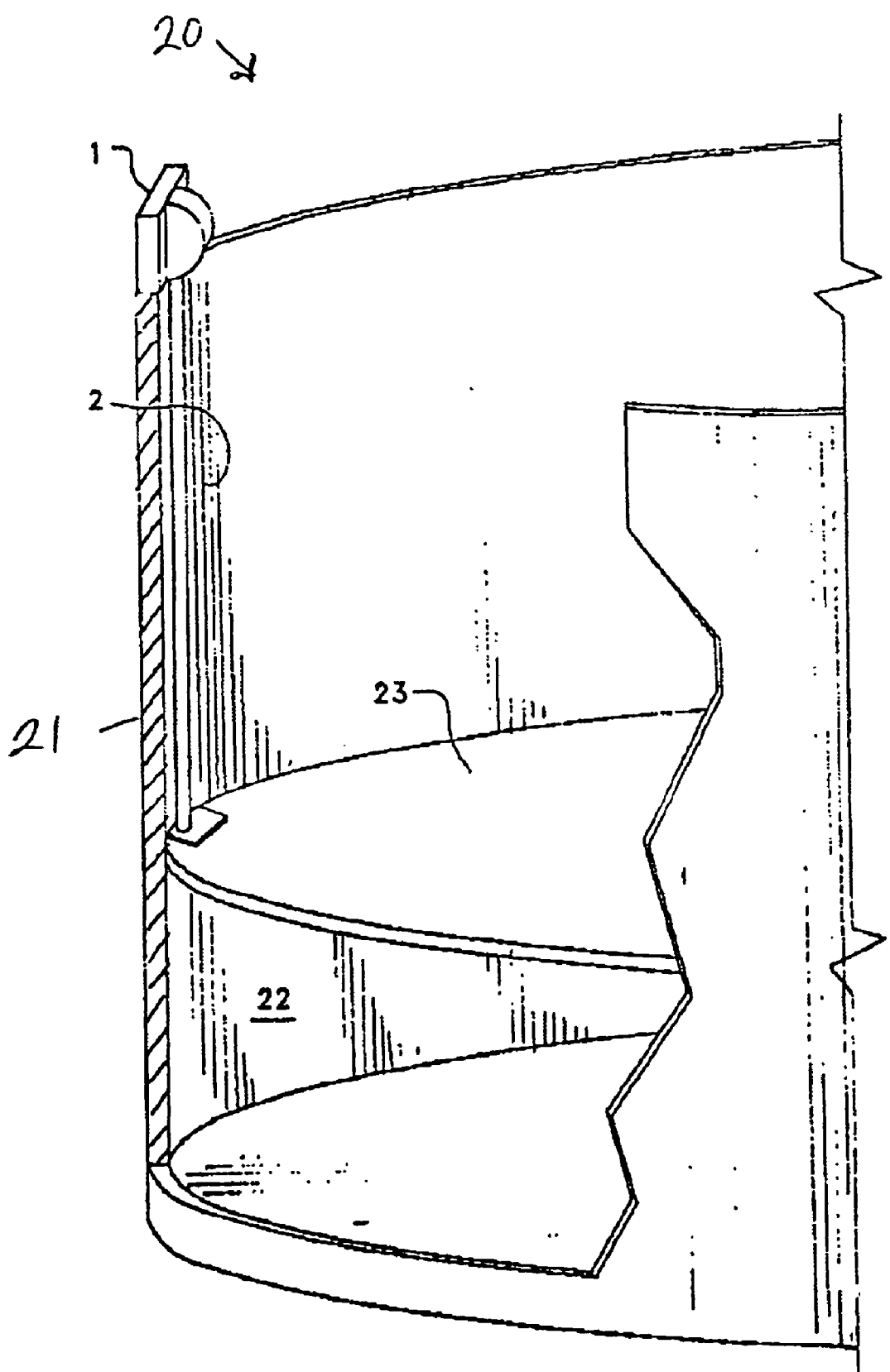
FIG. 2A is a partial cutaway perspective view of a fluid/liquid storage tank with the preferred embodiment roof grounding system installed.

Referring next to FIG. 2 the reel 1 can be seen bolted to the top of the cylindrical wall 21 of tank 20. A floating roof 23 floats on the fluid/liquid 22. The wire 2 is connected to the floating roof 23, directly below the reel.

Figure 4:
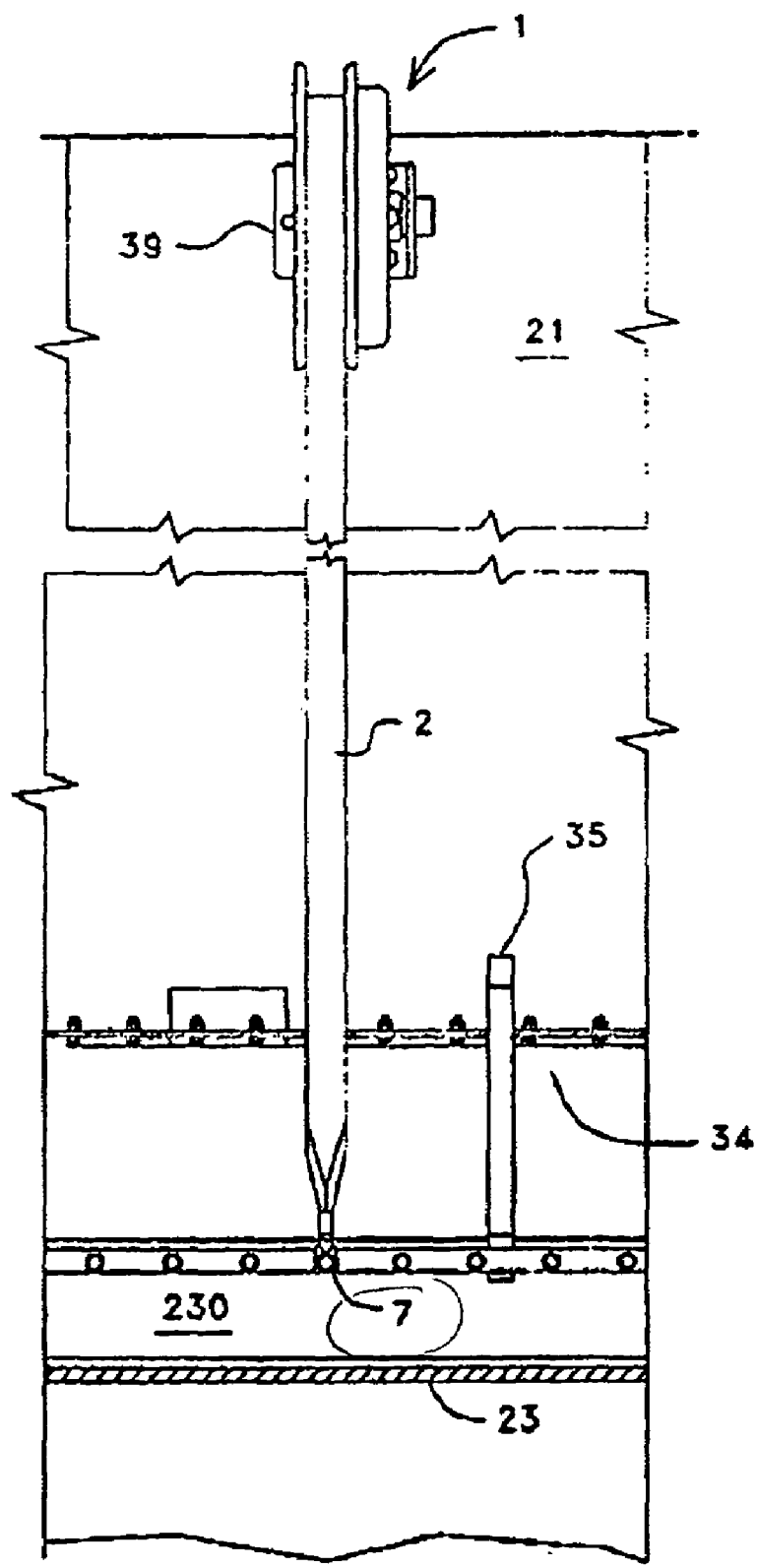
FIG. 4 is a plan view of the preferred embodiment as seen from inside the tank shown in FIG. 2.

Referring next to FIGS. 3, 4 the reel 1 has bolts 31 connecting the base 4 of the reel 1 to the cylindrical wall 21 of tank 20. The fluid/liquid 22 which may be oil floats the floating roof 23. As the floating roof 23 moves up and down it is centered in the cylindrical wall 21 of tank 20 by a known scissor assembly 33. A known fumes barrier 34 rides along the inside of the cylindrical wall 21 of tank 20 as does the scissor assembly 33. A known grounding shunt 35 also rides along the inside of the cylindrical wall 21 of tank 20, but can lose its grounding connection as debris builds up on the inside of the tank.

As shown in FIG. 3, excess length of wire 2 is wound around spool 5. Adjacent windings 300 of wire 2 wound around spool 5 touch each other. Because wire 2 may be un-insulated, adjacent windings 300 of wire 2 wound around spool 5 may short together.

The bolt and nut assembly 7 secures the lug 6 to the outer wall 230 of the floating roof 23. The spring 39 keeps the slack out of wire 2 so as to prevent entanglement with the shunt 35 and/or the scissor assembly 33. The path to ground is shown by arrows G. The impedance of the lug bolt and braided copper cable is about one ohm or less. The impedance of the whole system is about five ohms or less.

Although the present invention has been described with reference to preferred embodiments, numerous modifications and variations can be made and still the result will come within the scope of the invention. No limitation with respect to the specific embodiments disclosed herein is intended or should be inferred.

We claim:

1. In a fluid/liquid storage tank with a sidewall and a floating roof floating atop the fluid/liquid, an improved grounding system comprising:
   a reel connected to the sidewall;
   said reel having a low impedance conductor for lightning related frequencies connected to the floating roof;
   said conductor comprising a bare braided copper cable;
   said reel having a take up spool which keeps any slack out of the conductor and maintains a shortest fractional length;
   wherein an excess length of said conductor is wound around said take up spool thereby shorting together adjacent sections of said conductor wound around said take up spool; and
   said take up spool having a spring.

2. The improvement of claim 1, wherein the reel further comprises a base having bolts secured to the sidewall.

3. The improvement of claim 1, wherein the bare braided copper cable further comprises a lug having a bolt secured to the floating roof.

4. The improvement of claim 3, wherein an impedance of the lug and bolt, plus the bare braided copper cable plus the reel is about one ohm or less.

5. The apparatus of claim 1 further comprising a plurality of said reels and low impedance conductors connected to the sidewall.

6. The improvement of claim 1, wherein a total impedance of said improvement is about five ohms or less.

7. The improvement of claim 1, wherein the bare braided copper cable further comprises 480/30 flat braided copper wire.

8. A grounding system for a storage tank having a floating roof, said grounding system comprising:
   a wire having an end connected to the floating roof;
   said wire having a second end wound around a spool in a reel;
   said wire comprising a bare braided copper conductor;
   said spool having a take up mechanism to minimize slack in the wire;
   said take up mechanism having a spring;
   wherein an excess length of said wire is wound around said spool thereby shorting together adjacent sections of said wire wound around said spool;
   said reel having a grounded connection to a wall segment of the tank; and
   said wire having a low impedance for lightning related frequencies.

9. The grounding system of claim 8, wherein the bare braided copper conductor further comprises 480/30 flat braided copper wire.

10. The grounding system of claim 9, wherein a total impedance of the system is about five ohms or less.

11. The apparatus of claim 8 further comprising a plurality of said reels and wires.

12. A grounding system for a tank with a floating roof, said grounding system comprising:
   means for taking slack out of a bare braided copper cable connected from the floating roof to an upper segment of a tank wall, and thereby maintaining a minimum length;
   said means of taking slack out comprising a reel having a take up spool;
   said take up spool comprising a spring functioning to constantly pull up on the bare braided copper cable;
   wherein an excess length of said bare braided copper cable is wound around said take up spool thereby shorting together adjacent sections of said bare braided copper cable wound around said take up spool; and
   said bare braided copper cable having a low impedance for lightning related frequencies.

13. The grounding system of claim 12 wherein the system has a total impedance of about five ohms or less.

14. The grounding system of claim 12, wherein the bare braided copper cable has a bolt connection to the floating roof, and the reel has a base with a bolt connection to the tank wall.

15. The apparatus of claim 12 further comprising a plurality of said means for taking slack out of a cable.

16. The grounding system of claim 12, wherein the bare braided copper cable further comprises 480/30 flat braided copper wire.

* * * * *